(12) United States Patent
Smith et al.

(10) Patent No.: US 10,721,218 B2
(45) Date of Patent: *Jul. 21, 2020

(54) COMMUNICATION DEVICE FOR IMPLEMENTING SELECTIVE ENCRYPTION IN A SOFTWARE DEFINED NETWORK

(71) Applicant: Schweitzer Engineering Laboratories, Inc., Pullman, WA (US)

(72) Inventors: Rhett Smith, Kuna, ID (US); Barry Jakob Grussling, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,173

(22) Filed: Dec. 21, 2018

(65) Prior Publication Data

US 2019/0124053 A1 Apr. 25, 2019

Related U.S. Application Data

(63) Continuation of application No. 14/803,755, filed on Jul. 20, 2015, now Pat. No. 10,341,344.

(51) Int. Cl.
*H04L 29/06* (2006.01)
*H04L 12/717* (2013.01)
(Continued)

(52) U.S. Cl.
CPC .......... *H04L 63/0471* (2013.01); *H04L 45/38* (2013.01); *H04L 45/42* (2013.01);
(Continued)

(58) Field of Classification Search
CPC ..... H04L 63/0471; H04L 45/38; H04L 45/42; H04L 63/0428; H04L 63/06; H04L 63/162
See application file for complete search history.

(56) References Cited

U.S. PATENT DOCUMENTS 7,165,175 B1 * 1/2007 Kollmyer ........... H04N 21/8193
713/154
7,266,683 B1 * 9/2007 Nag .................... H04L 63/0428
380/217
(Continued)

FOREIGN PATENT DOCUMENTS

| EP | 2765751 | 8/2014 |
| KR | 20150051107 | 5/2015 |
| WO | 2015038040 | 3/2015 |

OTHER PUBLICATIONS

Mendonca et al, "The Case for Software-Defined Networking in Heterogeneous Networked Environments," CoNEXT Student '12, Dec. 10, 2012, pp. 59-60 (Year: 2012).*

(Continued)

*Primary Examiner* — Luu T Pham
*Assistant Examiner* — James J Wilcox
(74) *Attorney, Agent, or Firm* — Jared L. Cherry

(57) ABSTRACT

The present disclosure pertains to systems and methods for selectively encrypting data flows within a software defined network (SDN). In one embodiment, a communication device may be configured to receive a plurality of unencrypted data packets. The communication device may receive from an SDN controller a criterion used to identify at least one of the unencrypted data flows to be encrypted. Based on the criterion, an encryption subsystem may generate an encrypted data flow the unencrypted data packets based on an encryption key. In some embodiments, the encryption system may parse the packets and encrypt the data payloads without encrypting the routing information associated with the packet. In other embodiments, the encryption subsystem may be configured to encapsulate and encrypt the entire unencrypted data packet. In some embodiments, the encryption subsystem may further be configured (Continued)

to authenticate a sending device and/or to verify the integrity of a message.

18 Claims, 7 Drawing Sheets

(51) Int. Cl.
  *H04L 12/721* (2013.01)
  *H04L 12/715* (2013.01)
(52) U.S. Cl.
  CPC .......... *H04L 45/64* (2013.01); *H04L 63/0428* (2013.01); *H04L 63/06* (2013.01); *H04L 63/162* (2013.01)

(56) References Cited

U.S. PATENT DOCUMENTS

| | | | |
|---|---|---|---|
| 7,447,901 B1* | 11/2008 | Sullenberger | H04L 63/0272 713/153 |
| 8,584,228 B1* | 11/2013 | Brandwine | H04L 63/06 726/15 |
| 9,197,610 B1* | 11/2015 | Brandwine | H04L 63/06 |
| 9,286,171 B2 | 3/2016 | Cardona | |
| 9,432,255 B1 | 8/2016 | Hasan | |
| 9,432,380 B2 | 8/2016 | Margalit | |
| 9,674,081 B1* | 6/2017 | Jiang | H04L 41/0803 |
| 9,680,588 B2 | 6/2017 | Connolly | |
| 9,686,125 B2 | 6/2017 | Smith | |
| 9,769,060 B2 | 9/2017 | Dearien | |
| 9,866,483 B2 | 1/2018 | Smith | |
| 9,881,164 B1* | 1/2018 | McKay | H04L 63/0428 |
| 9,900,206 B2 | 2/2018 | Grussling | |
| 9,906,451 B2* | 2/2018 | Decusatis | H04L 47/10 |
| 9,923,779 B2 | 3/2018 | Berner | |
| 9,998,374 B1* | 6/2018 | Stark | H04L 45/745 |
| 10,447,676 B2* | 10/2019 | Cooper | H04L 45/42 |
| 10,599,458 B2* | 3/2020 | Variath | G06F 9/45558 |
| 2002/0129243 A1* | 9/2002 | Nanjundiah | H04N 21/23476 713/160 |
| 2002/0188839 A1* | 12/2002 | Noehring | H04L 69/04 713/153 |
| 2003/0133443 A1 | 7/2003 | Klinker | |
| 2003/0188159 A1* | 10/2003 | Josset | H04L 12/1836 713/163 |
| 2005/0025141 A1 | 2/2005 | Chao | |
| 2005/0036616 A1* | 2/2005 | Huang | H04L 9/0891 380/255 |
| 2005/0078672 A1 | 4/2005 | Caliskan | |
| 2005/0117595 A1* | 6/2005 | El-Beik | H04L 12/1425 370/401 |
| 2005/0192008 A1 | 9/2005 | Desai | |
| 2007/0101123 A1* | 5/2007 | Kollmyer | H04L 65/605 713/154 |
| 2007/0101125 A1* | 5/2007 | Lain | H04L 63/0823 713/156 |
| 2007/0113085 A1* | 5/2007 | Naslund | H04L 9/12 713/168 |
| 2008/0005558 A1* | 1/2008 | Hadley | H04L 9/3242 713/159 |
| 2008/0034197 A1* | 2/2008 | Engel | H04L 63/0428 713/150 |
| 2008/0080384 A1 | 4/2008 | Atkins | |
| 2008/0095368 A1* | 4/2008 | Iida | H04L 63/0272 380/259 |
| 2009/0257743 A1 | 10/2009 | Chung | |
| 2009/0285093 A1 | 11/2009 | Bolt | |
| 2009/0313189 A1 | 12/2009 | Sun | |
| 2010/0131633 A1* | 5/2010 | Herlein | H04L 67/025 709/223 |
| 2010/0241608 A1 | 9/2010 | Huang | |
| 2011/0085567 A1 | 4/2011 | Beecroft | |
| 2011/0087952 A1* | 4/2011 | Marin | H04L 1/0055 714/792 |
| 2011/0314271 A1* | 12/2011 | Boccon-Gibod | G06F 21/6218 713/151 |
| 2012/0166773 A1* | 6/2012 | Alekseev | H04L 9/0643 712/221 |
| 2013/0077477 A1 | 3/2013 | Daraiseh | |
| 2013/0108259 A1 | 5/2013 | Srinivas | |
| 2013/0159865 A1 | 6/2013 | Smith | |
| 2013/0188644 A1* | 7/2013 | Chen | H04L 65/607 370/392 |
| 2013/0223442 A1* | 8/2013 | Narayanan | H04L 49/25 370/389 |
| 2013/0250770 A1 | 9/2013 | Zou | |
| 2013/0263247 A1 | 10/2013 | Jungck | |
| 2014/0025945 A1 | 1/2014 | McGrew | |
| 2014/0064100 A1 | 3/2014 | Edwards | |
| 2014/0108486 A1* | 4/2014 | Borzycki | G06F 21/6218 709/201 |
| 2014/0108782 A1* | 4/2014 | Salinger | H04L 63/0457 713/155 |
| 2014/0112130 A1 | 4/2014 | Yang | |
| 2014/0115706 A1 | 4/2014 | Silva | |
| 2014/0129700 A1 | 5/2014 | Mehta | |
| 2014/0153572 A1* | 6/2014 | Hampel | H04L 12/6418 370/392 |
| 2014/0160939 A1 | 6/2014 | Arad | |
| 2014/0245387 A1 | 8/2014 | Colpo | |
| 2014/0281535 A1* | 9/2014 | Kane | H04L 63/0428 713/168 |
| 2014/0304785 A1* | 10/2014 | Kafle | H04L 61/1511 726/5 |
| 2014/0325038 A1 | 10/2014 | Kis | |
| 2014/0325649 A1 | 10/2014 | Zhang | |
| 2014/0371941 A1 | 12/2014 | Keller | |
| 2015/0003455 A1* | 1/2015 | Haddad | H04L 45/38 370/392 |
| 2015/0023176 A1* | 1/2015 | Korja | H04W 28/0273 370/236 |
| 2015/0081762 A1 | 3/2015 | Mason et al. | |
| 2015/0106517 A1* | 4/2015 | Saunders | H04W 12/0605 709/225 |
| 2015/0112933 A1 | 4/2015 | Satapathy | |
| 2015/0195190 A1 | 7/2015 | Shah Heydari | |
| 2015/0281067 A1* | 10/2015 | Wu | G06F 9/455 370/392 |
| 2015/0295713 A1* | 10/2015 | Oxford | H04L 63/0478 713/171 |
| 2015/0363522 A1 | 12/2015 | Maurya | |
| 2015/0372987 A1* | 12/2015 | Boynton | H04B 7/0617 713/150 |
| 2016/0006706 A1* | 1/2016 | Salinger | H04N 21/226 713/153 |
| 2016/0020946 A1* | 1/2016 | Morper | H04L 45/60 709/222 |
| 2016/0043881 A1* | 2/2016 | Forte | H04W 64/00 370/254 |
| 2016/0057313 A1* | 2/2016 | Pizot | H04L 63/08 358/1.14 |
| 2016/0080263 A1* | 3/2016 | Park | G06F 16/23 370/392 |
| 2016/0099890 A1* | 4/2016 | Kaufman | H04L 61/2575 709/203 |
| 2016/0119299 A1* | 4/2016 | Amulothu | H04L 63/20 380/255 |
| 2016/0125240 A1* | 5/2016 | Danikhno | G06K 9/00597 348/78 |
| 2016/0165454 A1 | 6/2016 | Li | |
| 2016/0330076 A1 | 11/2016 | Tiwari | |
| 2016/0337202 A1* | 11/2016 | Ben-Itzhak | H04L 41/5058 |
| 2016/0337247 A1 | 11/2016 | Yao | |
| 2016/0344592 A1 | 11/2016 | Cook | |
| 2017/0026225 A1 | 1/2017 | Smith | |
| 2017/0026226 A1 | 1/2017 | Grussling | |
| 2017/0026243 A1 | 1/2017 | Berner | |
| 2017/0026252 A1 | 1/2017 | Dearien | |
| 2017/0026276 A1 | 1/2017 | Dearien | |
| 2017/0026291 A1 | 1/2017 | Smith | |

(56) References Cited

U.S. PATENT DOCUMENTS

2017/0026292 A1    1/2017  Smith
2017/0026349 A1    1/2017  Smith
2017/0279689 A1*  9/2017  Mohan .................... H04L 45/38

OTHER PUBLICATIONS

Santos et al,"Software-Defined Networking Based Capacity Sharing in Hybrid Networks," 2013, IEEE, pp. 1-6 (Year: 2013).*
PCT/US2016/039582 Patent Cooperation Treaty, International Search Report and Written Opinion of the International Searching Authority, dated Feb. 8, 2017.

* cited by examiner

Figure 4

| Rule | Ingress Port | MAC Source Address | MAC Destination | IP Source Address | IP Destination | Source Port | Destination Port | Encrypt | Decrypt | Instructions |
|---|---|---|---|---|---|---|---|---|---|---|
| 1 | 1 | * | * | * | * | * | * | Y | N | Forward to port 10 |
| 2 | * | ::02A1:032B | ::034A:23B1 | * | * | * | * | N | N | Forward to port 2 |
| 3 | * | * | * | 10.2.3.1 | * | * | * | N | N | Forward to 10.1.8.1 |
| 4 | 3 | * | * | * | * | * | * | N | Y | Forward to port 8 |
| 5 | * | * | * | * | * | * | * | N | N | Drop packet |

400

COMMUNICATION DEVICE FOR IMPLEMENTING SELECTIVE ENCRYPTION IN A SOFTWARE DEFINED NETWORK

RELATED APPLICATION

This application is a continuation of U.S. patent application Ser. No. 14/803,755 filed on Jul. 20, 2015, titled "Communication Device for Implementing Selective Encryption in a Software Defined Network" which is herein incorporated in its entirety.

FEDERALLY SPONSORED RESEARCH OR DEVELOPMENT

This invention was made with U.S. Government support under Contract No.: DOE-OE0000678. The U.S. Government may have certain rights in this invention.

TECHNICAL FIELD

The present disclosure pertains to systems and methods for improving security in a software defined network ("SDN") by allowing a user to selectively encrypt data flows. More specifically, but not exclusively, various embodiments consistent with the present disclosure may be applied to communication devices used in electric power transmission and distribution systems utilizing an SDN to selectively encrypt data at a data link layer.

BRIEF DESCRIPTION OF THE DRAWINGS

Non-limiting and non-exhaustive embodiments of the disclosure are described, including various embodiments of the disclosure, with reference to the figures, in which:

FIG. 4 illustrates an action table that may be implemented in a communication device and may permit encryption of data packet payloads of selected data flows consistent with embodiments of the present disclosure.

DETAILED DESCRIPTION

Figure 1:
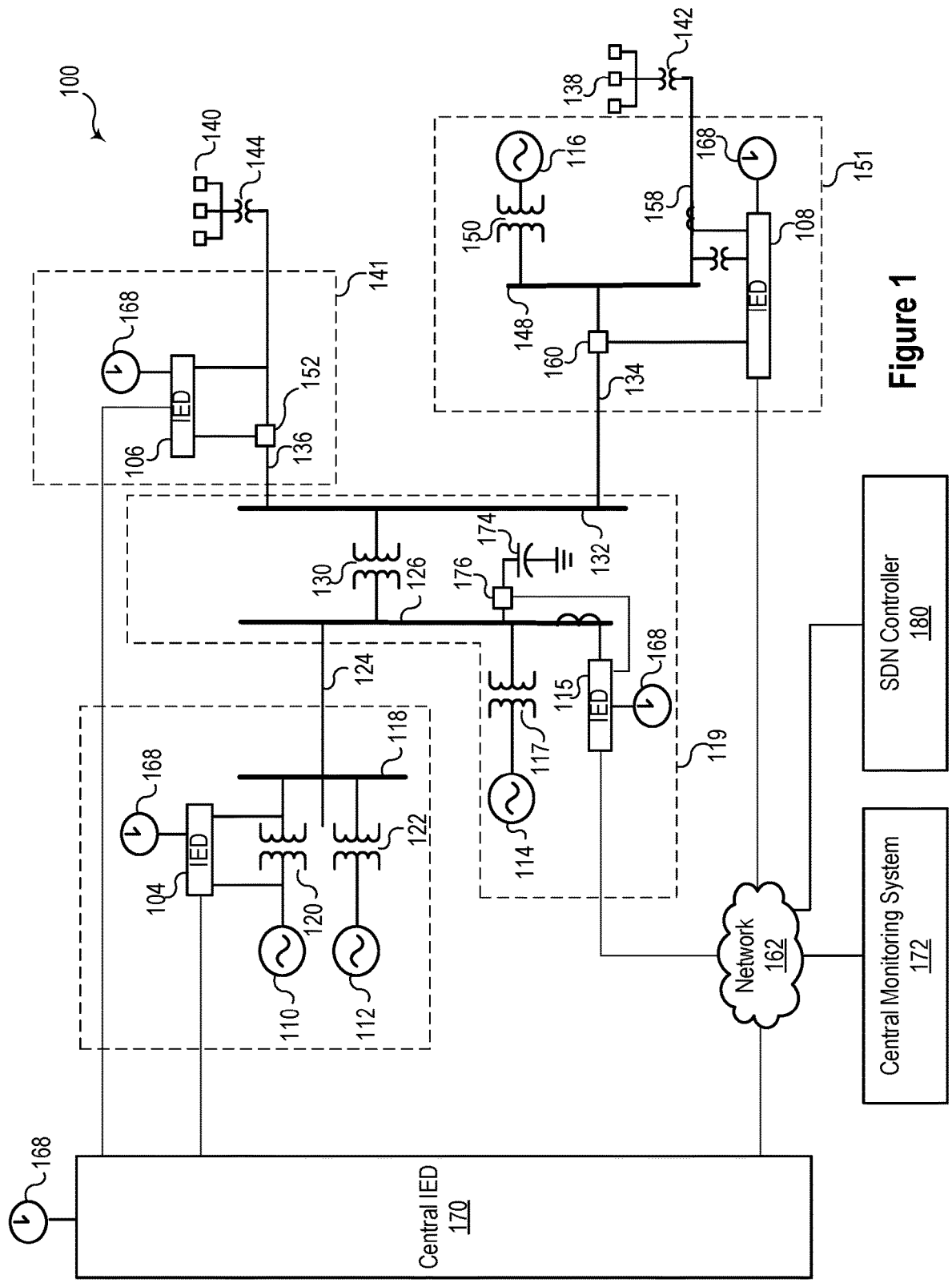
FIG. 1 illustrates a simplified one-line diagram of an electric power transmission and distribution system in which a plurality of communication devices may facilitate communication in a software defined network consistent with embodiments of the present disclosure.

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry information necessary for the proper assessment of power system conditions and for implementing control actions based on such conditions. In addition, such messages may be subject to time constraints because of the potential for rapid changes in conditions in an electric power transmission and distribution system.

Some electric power transmission and distribution systems may incorporate software defined network ("SDN") networking technologies that utilize a controller to regulate communications on the network. SDN networking technologies offer a variety of advantages that are advantageous in electric power systems (e.g., deny-by-default security, latency guarantees, deterministic transport capabilities, redundancy and fail over planning, etc.).

An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to achieve the optimal usage of network resources by creating specific data flows through the communication network. A data flow, as the term is used herein, refers to a set of parameters used to match and take action based on network packet contents. Data flows may permit dedicated paths based on a variety of criteria that after significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) has control logic and data forwarding logic integrated together. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting their forwarding tables. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a data selected flow rather mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on VLANs or MAC addresses.

Security is an increasingly significant concern in connection with critical infrastructure, such as electric power distribution and transmission systems. Electric power systems have increasingly becoming targets of cyberattacks. Due to the fact that electric power distribution and transmission systems may cover large areas, it may be necessary to transmit data over long distances. Such data should be protected from interception (e.g., using physical security and data security) however, concerns about security must be balanced against the functional requirements of the electric power transmission and distribution system. If the security requirements interfere with the performance of the system (e.g., by introducing too much latency), the data may not be useful. Where time sensitive data is transmitted over long distances (e.g., monitoring terminals of a long electric transmission line), the competing concerns of security and functionality may be in tension.

Systems and methods consistent with the present disclosure provide for selective encryption of specified data flows within the SDN. In various embodiments, encryption may be provided at a data link layer (i.e., layer 2 in the Open Systems Interconnection (OSI) model) or at the network layer (i.e., layer 3 in the OSI model). As such the systems and methods disclosed herein may be utilized in systems that utilize layer 2 only protocols (e.g., GOOSE multicast) and layer 3 protocols (e.g., TCP or UDP).

Various embodiments may provide an encryption solution that is enabled in the data plane of an SDN, and that is transparent to other devices within the electric power system. Further, in certain embodiments consistent with the present disclosure may reduce latency associated with data encryption using a variety of techniques.

Systems and methods consistent with the present disclosure may allow for specified data flows within a software defined network to be encrypted. The encryption may be implemented at a data link layer or a network layer, and may encrypt the data payload of packets passing through the data plane. The encryption may be transparent to data producing and data consuming devices, such that the data producing and data consuming devices may be separated from any additional complexity necessary to implement encryption of a selected data flow. In some embodiments, hardware-based encryption may be utilized to reduce latency.

Systems and methods consistent with the present disclosure may provide operators of a network with substantial control to select data that is encrypted rather than relying on a static link encryption tunnel, such as a virtual private network. Selecting data flows for encryption may also be beneficial during a disruption (e.g., a communication failure on the network). When disruption occurs and communication fail-over from one flow to another, the selection criteria for encrypting data may remain unchanged. As such, the fail-over may not impede the transport of the packets or other data flows that failed-over to the same physical link as the encrypted data flow. Still further, various embodiments of the present disclosure may enable visual representation of the network topology together with an indication of which flows are encrypted. The visualization may also provide in indication of where each data flow is encrypted and decrypted.

Embodiments consistent with the present disclosure may be utilized in a variety of communication devices. A communication device, as the term is used herein, is any device that is capable of accepting and forwarding data traffic in a data communication network. In addition to the functionality of accepting and forwarding data traffic, communication devices may also perform a wide variety of other functions and may range from simple to complex devices. Communication devices included within an SDN may include an encryption/decryption subsystem that enables the device to selectively encrypt or decrypt data packets within specified data flows. Certain embodiments of the present disclosure may be implemented as layer 2 switches.

In certain embodiments consistent with the present disclosure, a variety of techniques may be implemented to minimize latency associated with encryption. In some embodiments, the encryption of data payloads may be performed in hardware at communication devices distributed throughout the data plane. Hardware-based encryption may operate with less latency than a software-based approach; however the present disclosure is not exclusively limited to hardware-based encryption. Moreover, various embodiments consistent with the present disclosure may be configured to encrypt or decrypt a data payload without encrypting the entire patent.

A variety of encryption techniques and algorithms may be utilized in connection with systems and methods consistent with the present disclosure. Such techniques and algorithms may include Data Encryption Standard (DES), Advanced Encryption Standard (AES), International Data Encryption Algorithm (IDEA), RSA, Diffie-Hellman, etc. Still further, in some embodiments, various encryption techniques may be used for authentication of a sending device and verification of a message, in addition to encryption of data. More specifically, various forms of cryptographic authentication may be utilized to authenticate a sending device and to verify the contents of a data packet. In some embodiments, a hash message authentication code (HMAC) may be appended to a data packet as a trailer by a source of the data packet. The HMAC digest may be validated by a receiving device. A key used for data encryption may also be used for sender authentication and/or message verification in some instances, while in other cases, different keys may be used for data encryption and authentication.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates an embodiment of a simplified one-line diagram of an electric power transmission and distribution system 100 in which a plurality of communication devices may facilitate communication in a software defined network consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

An SDN controller 180 may be configured to interface with equipment in network 162 to create an SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

SDN controller 180 may be configured to selectively identify data flows to be encrypted. A variety of criteria may be utilized to identify data flows to be encrypted, including data flows including control instructions, data flows potentially vulnerable to cyber-attacks, data flows specified by an operator system 100, etc. Based on the criteria specified by the SDN controller 180 communication devices in network 162 may identify traffic and selectively encrypt or decrypt the identified traffic.

Figure 2:
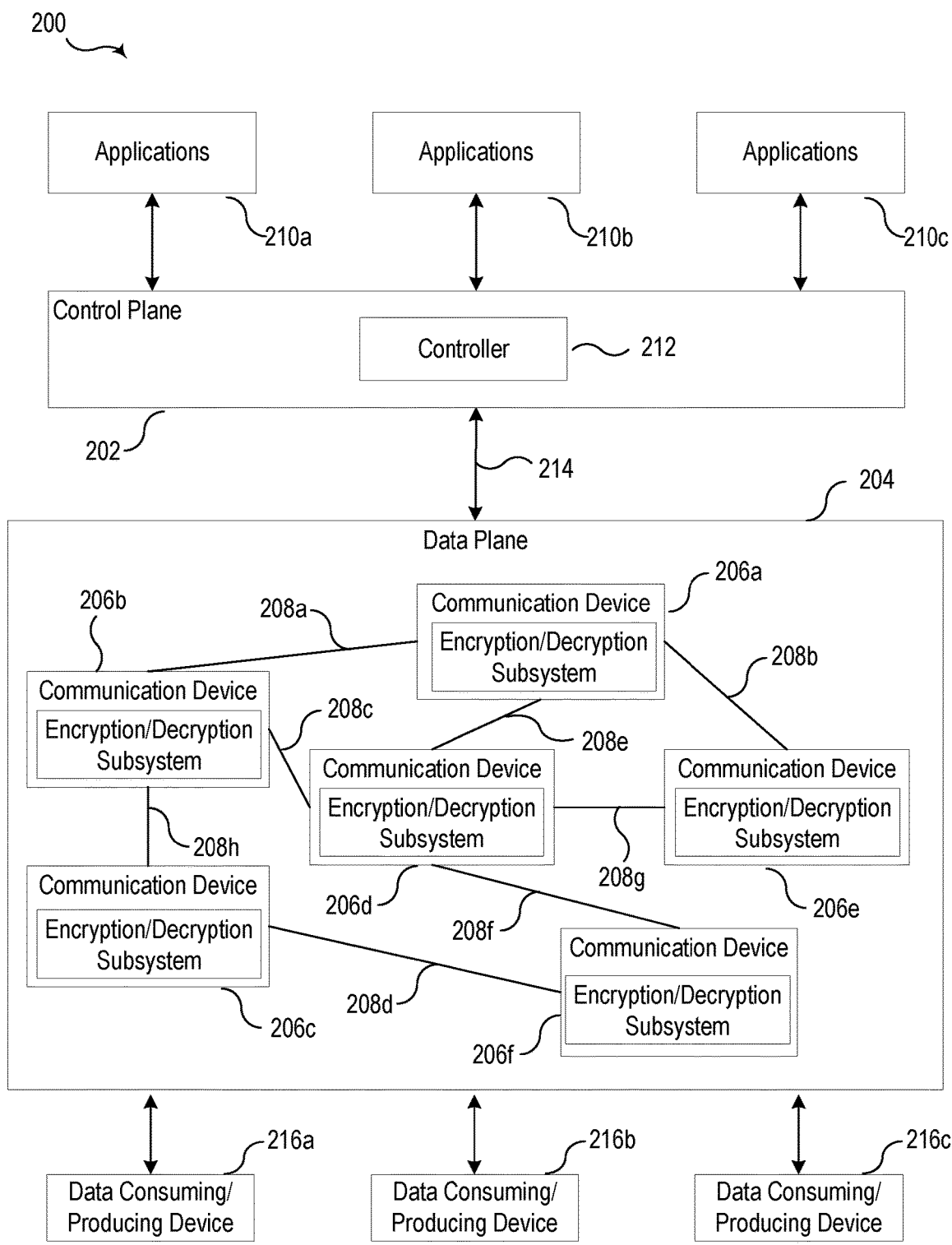
FIG. 2 illustrates a conceptual representation of an SDN architecture including a control plane, a data plane, and a plurality of data consumers/producer devices that may be deployed in an electric power transmission and distribution system consistent with embodiments of the present disclosure.

FIG. 2 illustrates a conceptual representation 200 of an SDN architecture including a control plane 202, a data plane 204, and a plurality of data consumers/producer devices 210a-c that may be deployed in an electric power transmission and distribution system consistent with embodiments of the present disclosure. The control plane 202 directs the flow of data through the data plane 204. More specifically, a controller 212 may communicate with the plurality of communication devices 206a-206f via an interface 214 to establish data flows. The controller may specify rules for routing traffic through the data plane 204 based on a variety of criteria.

As illustrated, the data plane 204 includes a plurality of communication devices 206a-206f in communication with one another via a plurality of physical links 208a-208h. In various embodiments, the communication devices 206a-206f may be embodied as switches, multiplexers, and other types of communication devices. The physical links 208a-208h may be embodied as Ethernet, fiber optic, and other forms of data communication channels. As illustrated, the physical links 208a-208h between the communication devices 206a-206f may provide redundant connections such that a failure of one of the physical links 208a-208h is incapable of completely blocking communication with an affected communication device. In some embodiments, the physical links 208a-208h may provide an N−1 redundancy or better.

The data consuming/producing devices 216a-c may represent a variety of devices within an electric power transmission and distribution system that produce or consume data. For example, data consuming/producing devices may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be routed through the data plane 204 using a plurality of data flows implemented by controller 212. Of course, data consuming/producing devices 216a-c may be embodied by a wide range of devices consistent with embodiments of the present disclosure.

The plurality of communication devices 206a-206f may each include an encryption/decryption subsystem that may encrypt and decrypt data selected data flows. For example, a data flow between data consuming/producing device 216a and device 216c may be selected for encryption. When data is received from data consuming/producing device 216a, the encryption subsystem one of the plurality of communication devices 206a-206f may encrypt the data before forwarding the data on to another communication device. The final communication device to receive the data prior to transmission to data consuming/producing device 216c may decrypt the data. Accordingly, the encryption and decryption of the data transmitted between data consuming/producing devices 216a and 216c may be completely transparent to the devices. In other words, the entire encryption and decryption process of the selected data flow may be performed by the plurality of communication devices 206a-206f without involving data consuming/producing devices 216a-c. In various embodiments, the systems and methods disclosed herein may be used to implement end-to-end encryption between a data producing device and a data consuming device that lack encryption capabilities. As such, the systems and methods used herein may be utilized to increase security within a network without the need for replacing legacy devices that may not support data encryption.

The plurality of applications 210a-c may represent a variety of applications 210a-c operating in an applications plane. In the SDN architecture illustrated in FIG. 2, controller 212 may expose an application programming interface (API) that services 210a-c can use to configure the data plane 204. In this scenario, controller 212 may act as an interface to the data plane 204 while the control logic resides in the applications 210a-c. The configuration of controller 212 and applications 210a-c may be tailored to meet a wide variety of specific needs.

Figure 3A:
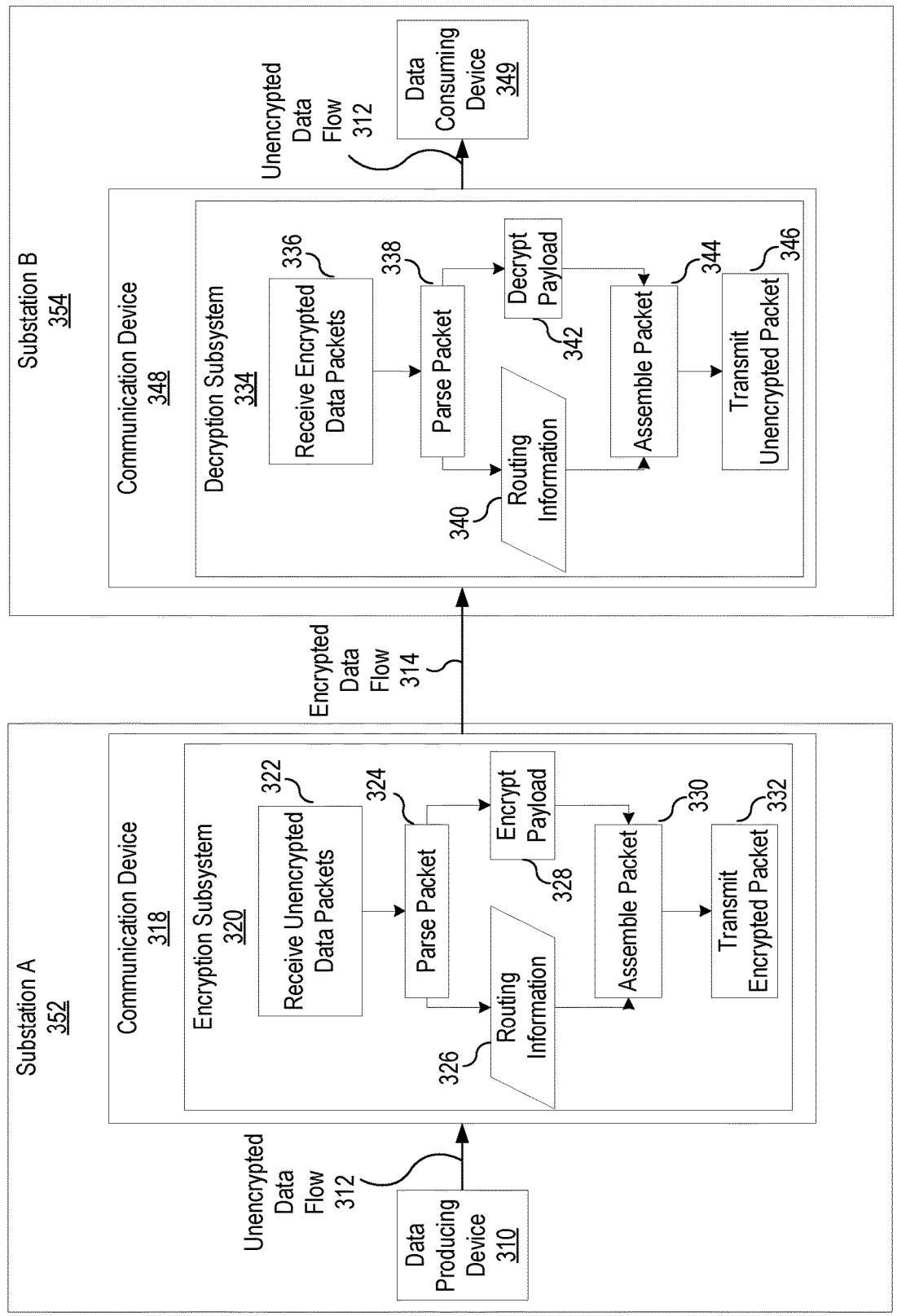
FIG. 3A illustrates a conceptual diagram of a system for encrypting a data flow between a data producing device and a data consuming device in two substations consistent with embodiments of the present disclosure.

FIG. 3A illustrates a conceptual diagram of a system 300 for encrypting a data flow between a data producing device 310 and a data consuming device 350 in two substations consistent with embodiments of the present disclosure. In the illustrated embodiment, a data producing device 310 located in substation A 352 may provide a stream of unencrypted data 312 to communication device 318. For purposes of simplicity, all of the data received by communication device 318 may be encrypted; however, in other embodiments communication device 318 may be configured to selectively identify data to be encrypted. In various embodiments, selection of data may be based on a variety of criteria, such as the origin of the data, the destination of the data, the type of data, the time sensitivity associated with the data, etc.

Communication device 318 may include an encryption subsystem 320 that is configured to receive unencrypted data packets at 322. The unencrypted data packets may be parsed at 324 and the routing information 326 may be separated from the payload. The payload may be encrypted at 328 using any of a variety of encryption algorithms. The routing information may remain unencrypted, or in other words, only the payload may be encrypted by the encryption subsystem 320. The routing information and the encrypted payload may be assembled into an encrypted data packet at 330. In some embodiments, the packed assembled at 330 may include a trailer that provides information that may be used for error detection. Further, the trailer may include an HMAC digest that is used to verify the integrity of the data packet or to authenticate the sender of the data packet. At 322, the encrypted packet may be transmitted. Again, for purposes of simplicity, communication device 318 is illustrated as including only an encryption subsystem; however, communication devices consistent with the present disclosure may be able to both encrypt data and decrypt data.

Communication device 318 may generate an encrypted data flow 314 that is transmitted to communication device 348. Communication device 348 and data consuming device 350 are located in substation B 354. Although not illustrated, the encrypted data flow may pass through a variety of intermediate devices before reaching communication device 348. In other words, communication device 318 and communication device 348 may not be in direct communication with one another.

A decryption subsystem 334 may be configured to receive encrypted data packets at 336. Again, communication device 348 is illustrated as including only a decryption subsystem for purposes of simplicity. The data packets may be parsed at 338 to separate the routing information 340 from the payload. The payload may be decrypted, and a packet including the decrypted payload 342 may be assembled at 344. At 346 the packet may be transmitted in an unencrypted data flow 312 to the data consuming device 350.

Figure 3B:
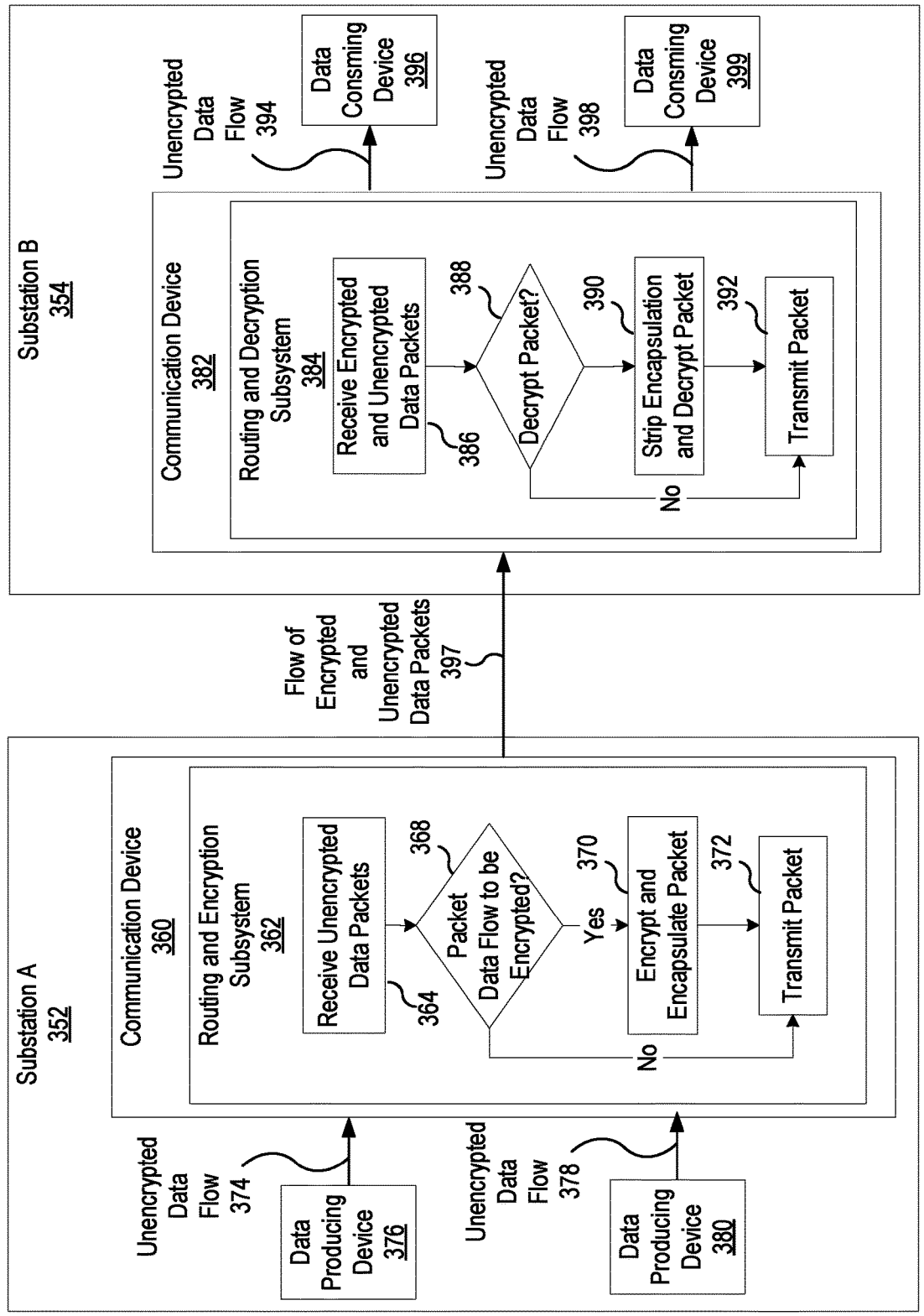
FIG. 3B illustrates a conceptual diagram of a system for selectively encrypting a data in specified data flows between data producing devices and a data consuming device in two substations consistent with embodiments of the present disclosure.

FIG. 3B illustrates a conceptual diagram of a system 350 for selectively encrypting specified data flows between data producing devices 376, 380 and a data consuming device 396, 399 in two substations consistent with embodiments of the present disclosure. In the illustrated embodiment, data producing devices 376, 380 located in substation A 352 may provide flows of unencrypted data 374, 378 to communication device 360. Communication device 360 may include a routing and encryption subsystem 362 that is configured to receive unencrypted data packets at 364 from data producing devices 376, 380.

At 368, the routing and encryption subsystem 362 may determine for each packet whether the data packet is associated with a data flow that is to be encrypted. If the packet is associated with a data flow that is not encrypted, the packet may proceed to 372 and may be transmitted. If the packet is to be encrypted, the packet may be encrypted and encapsulated at 370. In some embodiments, data flows originating from specific devices may be encrypted while data flows from other devices may remain unencrypted. For example, data flow 374 may be selected for encrypted, while data flow 378 remains unencrypted.

As described in connection with FIG. 3A, in certain embodiments only a data payload may be encrypted and the routing information may be preserved to reduce latency and/or computational resources devoted to encryption. In contrast, in the embodiment illustrated in FIG. 3B, the entire packet (i.e., the routing information, the data payload, and the trailer (if applicable)) may be encrypted and new routing information may be generated and appended to the encrypted packet. After the packet is encrypted and encapsulated, at 322, the packet may be transmitted. For purposes of simplicity, communication device 360 is illustrated as including only an encryption subsystem; however, communication devices consistent with the present disclosure may be able to both encrypt data and decrypt data. In some embodiments, a trailer may be generated that includes an authentication code that may enable a receiving device to authenticate a sending device. For example, unencrypted data from 374 from data producing device 376 may include an authentication code that allows a receiving device to authenticate received data packets and confirm that such packets originated from data producing device 376.

Communication device 360 may generate a flow of encrypted and unencrypted data packets 397 between communication device 360 and communication device 382. Communication device 382 and data consuming devices 396, 399 are located in substation B 354. Although not illustrated, the encrypted data flow may pass through a variety of intermediate devices before reaching communication device 382. In other words, communication device 360 and communication device 382 may not be in direct communication with one another, but rather may be connected through a larger network (not shown).

A decryption subsystem 334 may be configured to receive the flow encrypted and unencrypted data packets at 386. Again, communication device 384 is illustrated as including only a routing and decryption subsystem 384 for purposes of simplicity. Of course, communication device 384 may also include an encryption subsystem that enables bidirectional communication with communication device 360 or other devices. At 388, routing and decryption subsystem 384 may determine whether each data packet should be decrypted. If a particular packet does not need to be decrypted, the packet may be transmitted at 392. If it is determined at 388 that the packet needs to be decrypted, at 390, the encapsulation may be striped and the packet may be decrypted at 390. After the encapsulation is stripped and the packet is decrypted, the packet may transmitted at 392.

FIG. 4 illustrates an action table 400 that may be implemented in a communication device and may permit encryption of data packet payloads of selected data flows consistent with embodiments of the present disclosure. Table 400 may include a variety of types of information about the local communication device 308 and its associated data flows. In the illustrated embodiment, rule 1 provides that any data packets received in ingress port 1 is encrypted and forwarded to port 10. A rule that encrypts all data received on a specific ingress port may be appropriate when such a port receives a flow of unencrypted data from a data producing device. In various embodiments, such a device may include, for example, an IED configured to monitor an aspect of an electric power transmission and distribution system.

Rule 2 provides that information received from a device having a specific MAC address and destined for a device having a specific MAC address is not encrypted. The data is forwarded to port 2. A rule that permits traffic to pass without encryption may be created under various circumstances consistent with the present disclosure. For example, the rule may be appropriate where the communications remain within a physically controlled area (e.g., are confined to the same substation), or where the data has a low priority or low security risk.

Rule 3 provides that information received from a device having the particular IP address is to be encrypted and forwarded to a specific destination IP address. A rule that permits traffic to be identified may permit traffic to be routed to another device using an IP address.

Rule 4 provides that any packets received on port 3 are to be decrypted and forwarded to port 8. Rule 4 may indicate that the communication device incorporating action table 400 is in direct communication with a receiving device. The decryption may enable the encryption to be performed without involving the receiving device.

Rule 5 provides that any packets that do not meet the criteria of rules 1-4 is dropped. The deny-by-default setting implemented by rule 5 adds security by disallowing any communications that are not encompassed by existing rules. The deny-by-default policy implemented by rule 5 prevents authorized communication from occurring on the network and permits operators of the network to identify changes in network traffic.

Figure 5:
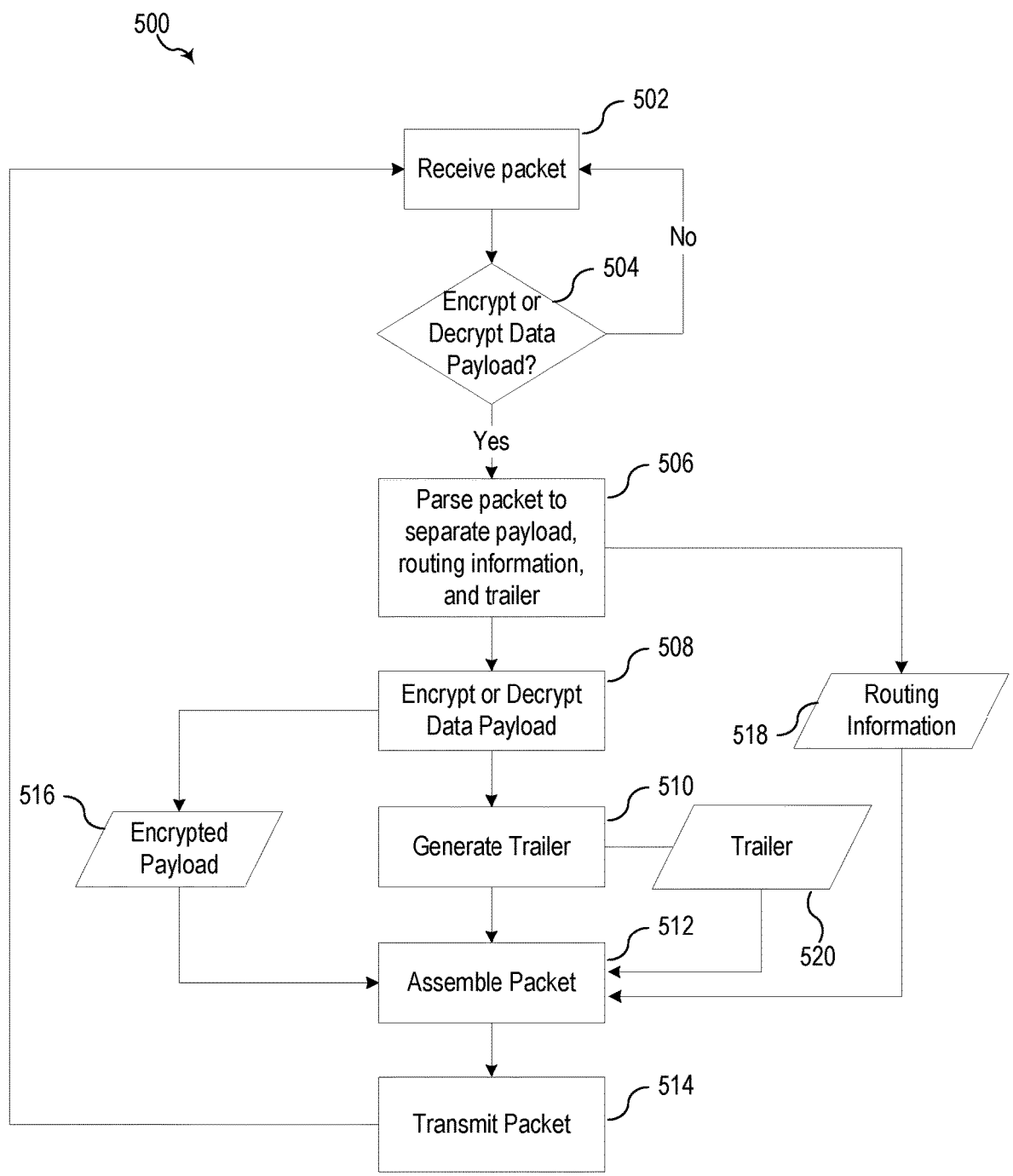
FIG. 5 illustrates a flow chart of a method that may be implemented by a communication device configured to selectively encrypt or decrypt a dataflow including a plurality of data packets consistent with embodiments of the present disclosure.

FIG. 5 illustrates a flow chart of a method 500 that may be implemented by a communication device configured to selectively encrypt or decrypt a dataflow including a plurality of data packets consistent with embodiments of the present disclosure. At 502, a packet may be received by a communication device. The communication device may determine at 504 whether the data payload of a data packet should be encrypted or decrypted. As discussed above, a variety of conditions may be specified to selectively identify which data packets include data payloads that should be encrypted or decrypted. In some embodiments, an action table similar to the action table illustrated in FIG. 4 may specify criteria for selectively encrypting certain data flows within an SDN.

Returning to a discussion of FIG. 5, at 506, the packet may be parsed and the payload may be separated from the routing information. In some embodiments, the packet may also include a trailer or other information that may be utilized for error detection and correction that may also be separated.

At 508, the data payload may be encrypted using any of a variety of encryption and or cryptographic authentication techniques. Such techniques may include, but are not limited to hashed messaged authentication codes (HMAC) algorithms with Message Digest 5 (MD5) or Secure Hashing Algorithm (SHA), and encryption algorithms like Data Encryption Standard (DES), Advanced Encryption Standard (AES), International Data Encryption Algorithm (IDEA), RSA, Diffie-Hellman, etc. In some embodiments, the encryption of the data payload may be performed using hardware to minimize the latency associated with encryption of the data packet. In one specific embodiment, the encryption of the data payload may be performed using a field-programmable gate array (FPGA) or an application specific integrated circuit (ASIC). In some embodiments, a key used for encryption may also be used for message verification and sender authentication, while in other embodiments, the key used for authentication may be different from the used for encryption.

At 510 a trailer 520 may be generated if appropriate based on the type of communication protocol used in connection with method 500. In various communication protocols a trailer may include information to detect communication errors, such as a cyclic redundancy check (CRC). In some embodiments, the trailer may further include error correcting information that may enable certain communication errors to be corrected. At 512, a packet may be assembled that includes the routing information 518, the encrypted payload 516, and the trailer 520. At 514, a packet may be transmitted to a receiving device specified in the routing information.

Figure 6:
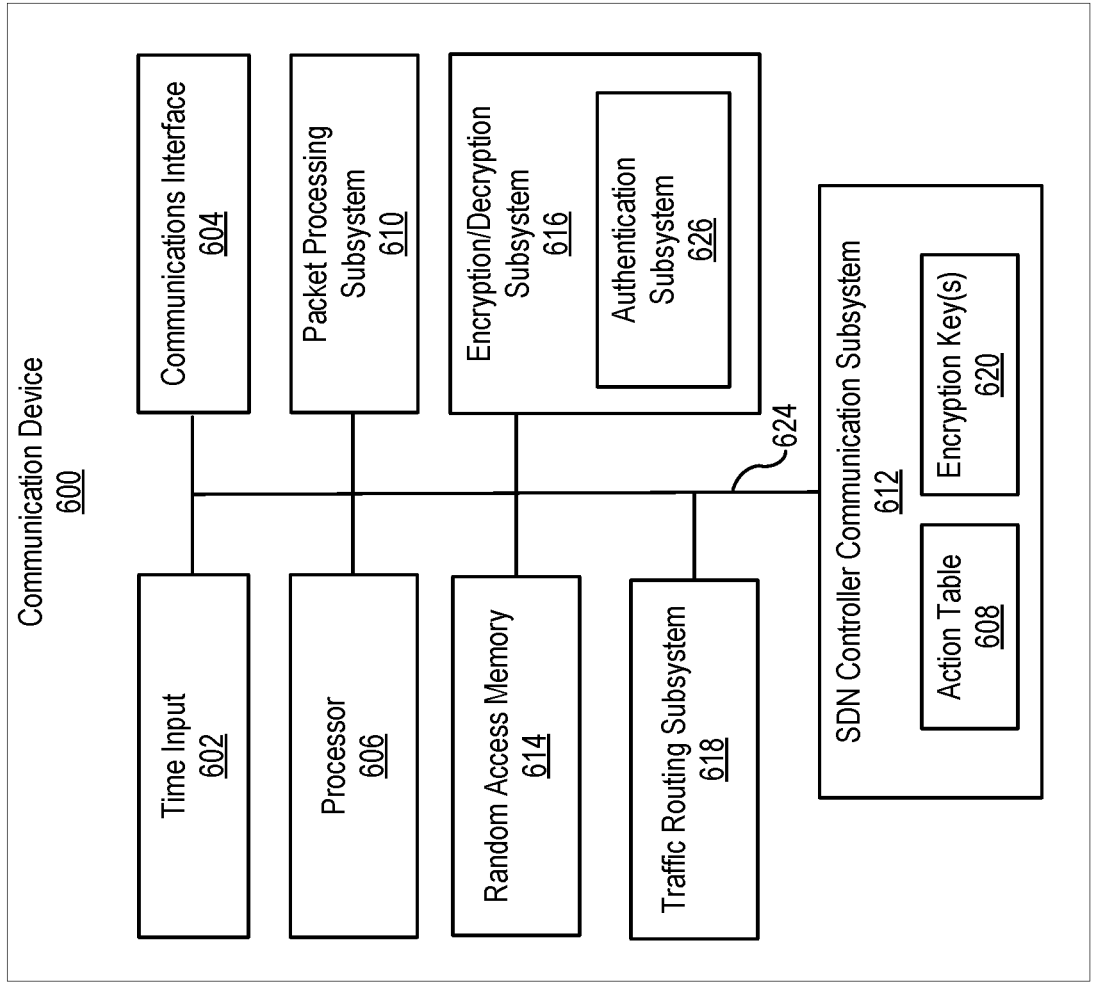
FIG. 6 illustrates a functional block diagram of a communication device configured to encrypt or decrypt data packet payloads of selected data flows consistent with embodiments of the present disclosure.

FIG. 6 illustrates a functional block diagram of a communication device configured to encrypt or decrypt data packet payloads of selected data flows consistent with embodiments of the present disclosure. In some embodiments, communication device 600 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

Communication device 600 includes a communications interface 604 configured to communicate with other devices (not shown). Communications interface 604 may facilitate communications with multiple devices. Communication device 600 may further include a time input 602, which may be used to receive a time signal (e.g., a common time reference) allowing communication device 600 to apply a time-stamp received data. In certain embodiments, a common time reference may be received via communications interface 604, and accordingly, a separate time input may not be required. One such embodiment may employ the IEEE 1588 protocol. A data bus 624 may facilitate communication among various components of communication device 600.

Processor 606 may be configured to process communications received via communications interface 604 and time input 602 and to coordinate the operation of the other components of communication device 600. Processor 606 may operate using any number of processing rates and architectures. Processor 606 may be configured to perform any of the various algorithms and calculations described herein. Processor 606 may be embodied as a general purpose integrated circuit, an application specific integrated circuit, a field-programmable gate array, and/or any other suitable programmable logic device.

A packet processing subsystem 610 may be configured to receive, parse, and regenerate data packets selected for encryption or decryption. As discussed above in connection with FIG. 5, when a data packet is selected for encryption or decryption, the packet may be parsed so that the routing information associated with the packet remains unchanged. Further, a packet trailer or other information for detection of communication errors may need to be regenerated based on encryption of a data payload.

Instructions to be executed by processor 606 may be stored in random access memory 614 (RAM). Such instructions may include information for processing routing and processing data packets received via communications interface 604 based on a plurality of data flows.

An SDN controller communication subsystem 612 may be configured to communicate with an SDN controller and to configure communication 600 as based on instructions received from the SDN controller. In various embodiments, SDN controller communication subsystem 612 may be configured to receive or generate an action table 608 that includes rules for routing data and encrypting or decrypting specific data flows. A traffic routing subsystem 618 may be configured to process the data communications received via communications interface 604 and to appropriately route such communications based on applicable data flows.

In various embodiments, the SDN controller communication subsystem 612 may be configured to receive encryption keys from the SDN controller. The SDN controller may distribute appropriate encryption keys needed for communication device 600 to encrypt or decrypt selected data packets. Use of the SDN controller to distribute encryption key(s) 620 may avoid the need to pre-share encryption key(s) 620 because the SDN controller already has established a trusted relationship with the communication device 600. In some embodiments, key distribution may be completed when the SDN controller establishes rules implemented by communication device 600 and keys could be persistent through sessions. In other embodiments, new keys may be distributed for each session.

An encryption subsystem 616 may be configured to selectively encrypt or decrypt data payloads associated with certain data packets received via communications interface 604. Encryption subsystem 616 may be configured to implement a variety of types of standardized or proprietary encryption algorithms. In some embodiments, encryption subsystem 616 may be integrated with processor 606, such that the encryption/decryption of data is performed in hardware. The use of hardware to perform the encryption/decryption of data may help to minimize latency introduced by encrypting and decrypting data.

An authentication subsystem 626 may be configured to authenticate a message and/or the sender of a message. In various embodiments, a number of techniques may be utilized by authentication subsystem 626. In one specific embodiment, authentication subsystem 626 may be configured to receive an HMAC digest that may be used to verify the data integrity and to authenticate the source of message. The HMAC digest may be appended to a data frame as a trailer by the source. In some embodiments, the key used for authentication may be the same key used for encryption, while in other embodiments, the key used for authentication may be different from the used for encryption.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A communication device configured to selectively encrypt a data flow in a software defined network (SDN), the communication device comprising:
    a data bus;
    a communication interface in communication with the data bus, the communication interface to receive a plurality of unencrypted data packets originating from a data producing device in an electric power system;
    an SDN controller communication subsystem in communication with the data bus and to receive from an SDN controller a first criterion used to identify a subset of the plurality of unencrypted data packets in the data flow to be encrypted;
    an encryption subsystem to generate an encrypted data payload from an unencrypted data payload based on an encryption key, and configured to:
        identify unencrypted data packets to be encrypted based on the first criterion and comprising unencrypted routing information and an unencrypted payload;
        selectively parse each identified data packet to extract the unencrypted routing information and the unencrypted data payload;
        generate a hash message authentication code (HMAC);
        assemble a substitute packet comprising the unencrypted routing information and the encrypted data payload; and
        append the substitute packet with the HMAC; and,
    the communication interface configured to insert the substitute packet into the data flow directed to a data consuming device in the electric power system using the unencrypted routing information via the communication interface;
    wherein the HMAC is at least partially determined based on an identifier of a source of at least one of the plurality of unencrypted data packets, enabling a receiving device to identify the source based at least in part on the HMAC;
    wherein the first criterion comprises a determination that a first physical location at which the data consuming device identified by the routing information is separated from a second physical location at which the communication device is located.

2. The communication device of claim 1, wherein the communication device is configured for use in a network that provides end-to-end encryption between the data producing device and a data consuming device that lacks encryption capabilities.

3. The communication device of claim 1, further comprising:
    a decryption subsystem configured to generate an unencrypted data payload from an encrypted data payload based on the encryption key;
    wherein the communication interface is further to receive a plurality of encrypted data packets;
    wherein the SDN controller communication subsystem is further to receive from the SDN controller a second criterion used to identify a subset of the plurality of encrypted data packets to be decrypted; and
    further comprising a packet processing subsystem to:
        identify encrypted data packets to be decrypted based on the second criterion and comprising unencrypted routing information and an encrypted payload;
        selectively parse each identified data packet to extract the unencrypted routing information and the encrypted data payload;
        generate an unencrypted data payload using the encryption key;
        generate a second substitute packet comprising the unencrypted routing information and the unencrypted data payload; and
        transmit the second substitute packet using the unencrypted routing information via the communication interface.

4. The communication device of claim 3, wherein the second criterion comprises a determination that the data consuming device identified by the routing information and the communication device are both located at a common physical location.

5. The communication device of claim 3, wherein the decryption subsystem is further configured to receive the HMAC appended to at least one of the encrypted data packets and to verify at least one of a source of the at least one of the encrypted data packets and a message integrity based on the HMAC.

6. The communication device of claim 1, wherein the SDN controller communication subsystem is further configured to receive the encryption key from the SDN controller.

7. The communication device of claim 6, wherein the encryption key persists through multiple sessions with the SDN controller.

8. The communication device of claim 1, wherein the encryption subsystem is implemented in one of a field-programmable gate array and an application-specific integrated circuit.

9. The communication device of claim 1, wherein the HMAC code is at least partially determined based on the encrypted data payload, enabling a receiving device to verify an integrity of the substitute data packet based at least in part on the HMAC code.

10. A method of selectively encrypting a data flow in a software defined network (SDN), the method comprising:
receiving a plurality of unencrypted data packets originating from a data producing device;
receiving from an SDN controller a first criterion used to identify a subset of the plurality of unencrypted data packets in the data flow to be encrypted;
identifying a subset of the unencrypted data packets based on the first criterion each of the plurality of unencrypted data packets comprising unencrypted routing information and an unencrypted payload;
selectively parsing each identified data packet and extracting the unencrypted routing information and the unencrypted data payload;
generating a hash message authentication code (HMAC);
encrypting the unencrypted data payload to generate an encrypted data payload using an encryption key;
assembling a substitute packet comprising the unencrypted routing information and the encrypted data payload;
appending the substitute packet with the HMAC; and
transmitting the substitute packet to a data consuming device using the unencrypted routing information via an communication interface;
wherein the HMAC is at least partially determined based on an identifier of a source of at least one of the plurality of unencrypted data packets, enabling a receiving device to identify the source based at least in part on the authentication code;
wherein the first criterion comprises a determination that a first physical location at which the data consuming device identified by the routing information is separated from a second physical location at which the communication device is located.

11. The method of claim 10, wherein the communication device is configured for use in a network that provides end-to-end encryption between the data producing device and a data consuming device that lacks encryption capabilities.

12. The method of claim 10, further comprising:
receiving a plurality of encrypted data packets;
receiving from the SDN controller a second criterion used to identify a subset of the plurality of encrypted data packets to be decrypted;
identifying encrypted data packets to be decrypted based on the second criterion and comprising unencrypted routing information and an encrypted payload;
selectively parsing each identified data packet to be decrypted to extract the unencrypted routing information and the encrypted data payload;
decrypting the encrypted data payload and generating an unencrypted data payload;
generating a second substitute packet comprising the unencrypted routing information and the unencrypted data payload; and
transmitting the second substitute packet using the unencrypted routing information via the communication interface.

13. The method of claim 12, wherein the second criterion comprises determining that a receiving device identified by the routing information and the communication device are both located at a common physical location.

14. The method of claim 10, further comprising generating an error detection code based on the encrypted data payload and wherein the substitute packet comprises the error detection code.

15. The method of claim 14, further comprising generating a trailer for the encrypted packet and wherein the trailer comprises the error detection code.

16. The method of claim 10, further comprising receiving the encryption key from the SDN controller.

17. The method of claim 16, wherein the encryption key persists through multiple sessions with the SDN controller.

18. A layer 2 switch configured to selectively encrypt a data flow in a software defined network (SDN), the switch comprising:
a data bus;
a communication interface in communication with the data bus, the communication interface configured to receive a plurality of unencrypted data packets originating from a data producing device;
an SDN controller communication subsystem in communication with the data bus and configured to: receive from an SDN controller a criterion used to identify a subset of the plurality of unencrypted data packets in the data flow to be encrypted;
a hardware-based encryption subsystem configured to generate an encrypted data payload from an unencrypted data payload based on an encryption key;
a packet processing subsystem configured to:
identify unencrypted data packets to be encrypted based on the criterion and comprising unencrypted routing information and an unencrypted payload
selectively parse each identified data packet to extract the unencrypted routing information and the unencrypted data payload;
generate an encrypted data payload using the encryption key;
generate a hash message authentication code (HMAC);
assemble a substitute packet comprising the unencrypted routing information and the encrypted data payload appended with the HMAC; and
transmit the substitute packet to a data consuming device in an electrical power system using the unencrypted routing information via the communication interface;
wherein the HMAC is at least partially determined based on an identifier of a source of at least one of the plurality of unencrypted data packets, enabling a receiving device to identify the source based at least in part on the HMAC;

wherein the criterion comprises a determination that a first physical location at which the data consuming device identified by the routing information is separated from a second physical location at which the communication device is located.

* * * * *